United States Patent
Krause

(10) Patent No.: US 11,368,799 B2
(45) Date of Patent: Jun. 21, 2022

(54) HEARING DEVICE CUSTOMIZATION SYSTEMS AND METHODS

(71) Applicant: Securboration, Inc., Melbourne, FL (US)

(72) Inventor: Lee Krause, Idialantic, FL (US)

(73) Assignee: Securboration, Inc., Melbourne, FL (US)

( * ) Notice: Subject to any disclaimer, the term of this patent is extended or adjusted under 35 U.S.C. 154(b) by 0 days.

(21) Appl. No.: 17/167,485

(22) Filed: Feb. 4, 2021

(65) Prior Publication Data

US 2021/0243535 A1     Aug. 5, 2021

Related U.S. Application Data

(60) Provisional application No. 62/969,909, filed on Feb. 4, 2020.

(51) Int. Cl.
| | |
|---|---|
| *H04R 25/00* | (2006.01) |
| *G10L 17/06* | (2013.01) |
| *G10L 25/18* | (2013.01) |
| *G10L 25/84* | (2013.01) |

(52) U.S. Cl.
CPC ............ *H04R 25/505* (2013.01); *G10L 17/06* (2013.01); *G10L 25/18* (2013.01); *G10L 25/84* (2013.01); *H04R 25/558* (2013.01); *H04R 2225/55* (2013.01)

(58) Field of Classification Search
CPC ................ H04R 25/505; H04R 25/558; H04R 2225/55; H04R 25/70; G10L 17/06; G10L 25/18; G10L 25/84; G10L 13/00; G10L 25/48
See application file for complete search history.

(56) References Cited

U.S. PATENT DOCUMENTS

| | | | |
|---|---|---|---|
| 2011/0144997 A1* | 6/2011 | Mizuguchi | G10L 13/06 704/258 |
| 2014/0243913 A1* | 8/2014 | Lineaweaver | H04R 25/70 607/57 |
| 2017/0263239 A1* | 9/2017 | Yanagisawa | G10L 13/08 |
| 2020/0029159 A1* | 1/2020 | Clark | G10K 11/1752 |
| 2020/0279551 A1* | 9/2020 | Sung | G10L 17/00 |

* cited by examiner

*Primary Examiner* — Tuan D Nguyen
(74) *Attorney, Agent, or Firm* — Danielson Legal LLC

(57) ABSTRACT

Methods and systems for customizing a hearing device. The disclosed methods involve receiving an audio sample associated with a target entity, calculating at least one acoustic parameter from the audio sample, generating an audio stimulus using the at least one calculated acoustic parameter, presenting the audio stimulus to a user, receiving a response to the audio stimulus, and adjusting the hearing device based on an optimal parameter.

19 Claims, 3 Drawing Sheets

HEARING DEVICE CUSTOMIZATION SYSTEMS AND METHODS

CROSS REFERENCE TO RELATED APPLICATIONS

The present application claims the benefit of U.S. provisional application No. 62/969,909, filed on Feb. 4, 2020, the entire disclosure of which is incorporated by reference as if set forth in its entirety herein.

TECHNICAL FIELD

Embodiments described herein generally relate to hearing devices and, more particularly but not exclusively, to systems, devices, and methods for customizing hearing devices.

BACKGROUND

Hearing devices such as hearing aids require some level of configuration before use. This typically involves presenting a stimulus or stimuli to a user and leveraging their responses to to configure the hearing device. The presented stimuli may include naturally-produced sound or artificially-produced sound (e.g., computer-generated speech or synthetic speech). Either of these types of stimuli may be further manipulated to achieve a desired set of stimuli.

The stimuli may be used in iterative tests in which the user is asked to: (1) identify when they hear a sound; (2) discriminate one sound from another; (3) provide a subjective/qualitative description of the sound, such as "muffled" or "sharp" or (4) identify a specific sound, such as in a phoneme recognition task. The test results are used to identify hearing device parameters to achieve the best performance for the user.

Even with these configuration procedures, however, users may have difficulty in hearing specific individuals, even those they frequently interact with, such as their spouse, children, grandchildren, co-workers, or other individuals. Similarly, users may also have difficulty in hearing or understanding speech in certain environments.

A need exists, therefore, for improved hearing device configuration systems and methods.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

According to one aspect, embodiments relate to a method of configuring a hearing device. The method includes receiving, using an interface, an audio sample associated with a target entity; calculating, using a processor executing instructions stored on memory, at least one acoustic parameter from the audio sample; generating, using the processor, an audio stimulus using the at least one calculated acoustic parameter; presenting, using a hearing device, the audio stimulus to a user; receiving at the interface a response to the audio stimulus from the user, wherein the response is indicative of an optimal parameter for the hearing device for the user; and adjusting, using the processor, the hearing device based on the optimal parameter.

In some embodiments, the target entity is a person or an environment.

In some embodiments, the audio stimulus further includes a plurality of acoustic characteristics for tuning the hearing device.

In some embodiments, calculating the at least one acoustic parameter includes: analyzing the audio sample associated with the target entity, and determining, based on the analysis of the audio sample, a fundamental frequency of the audio sample, vowel formant frequencies of the audio sample, or formant frequencies of the audio sample.

In some embodiments, receiving the audio sample includes: receiving a voice sample of a person, determining a characteristic of the voice sample, wherein the characteristic of the voice sample is a fundamental frequency of the voice sample, a vowel formant frequency of the voice sample, or a formant bandwidth of the voice sample, comparing the characteristic of the voice sample to a library of existing voice samples, matching the voice sample to an existing voice sample of the library based on the comparison, and selecting the matched existing voice sample as the audio sample.

In some embodiments, the method further includes manipulating the audio stimulus prior to presenting the audio stimulus to the user.

In some embodiments, generating the audio stimulus includes generating the audio stimulus based on the audio sample using speech synthesis or computer-generated speech.

In some embodiments, the audio sample includes ambient noise in an environment, and the generated audio stimulus is based on the ambient noise and speech stimulus. In some embodiments, the calculated acoustic parameter of the ambient noise includes spectral shape of the ambient noise, temporal overlap of the ambient noise, or spectro-temporal changes of the ambient noise.

According to another aspect, embodiments relate to a system for configuring a hearing device. The system includes an interface for receiving an audio sample associated with a target entity; a memory; and a processor executing instructions stored on the memory to: calculate at least one acoustic parameter from the audio sample, generate an audio stimulus using the at least one calculated acoustic parameter, wherein the interface is further configured to present the audio stimulus to a user, receive a response to the audio stimulus from the user, wherein the response is indicative of an optimal parameter for the hearing device for the user, and adjust the hearing device based on the optimal parameter.

In some embodiments, the target entity is a person or an environment.

In some embodiments, the audio stimulus further includes a plurality of acoustic characteristics for tuning the hearing device.

In some embodiments, the processor calculates the at least one parameter by: analyzing the audio sample associated with the target entity, and determining, based on the analysis of the audio sample, a fundamental frequency of the audio sample, vowel formant frequencies of the audio sample, or formant frequencies of the audio sample.

In some embodiments, the audio sample is a voice sample of a person, and the processor is further configured to determine a characteristic of the voice sample, wherein the characteristic of the voice sample is a fundamental frequency of the voice sample, a vowel formant frequency of the voice sample, or a formant bandwidth of the voice sample; compare the characteristic of the voice sample to a library of existing voice samples, match the voice sample to an existing voice sample of the library based on the comparison, and select the matched existing voice sample as the audio sample.

In some embodiments, the processor is further configured to manipulate the audio stimulus prior to presenting the audio stimulus to the user.

In some embodiments, the processor generates the audio stimulus using speech synthesis or computer-generated speech.

In some embodiments, the audio sample includes ambient noise in an environment, and the generated audio stimulus is based on the ambient noise and speech stimulus.

In some embodiments, the calculated acoustic parameter of the ambient noise includes spectral shape of the ambient noise, temporal overlap of the ambient noise, or spectrotemporal changes of the ambient noise.

According to yet another aspect, embodiments relate to a non-transitory computer readable medium containing computer-executable instructions for performing a method of configuring a hearing device. The non-transitory computer readable medium includes computer-executable instructions for receiving, using an interface, an audio sample associated with a target entity; computer-executable instructions for calculating, using a processor executing instructions stored on memory, at least one acoustic parameter from the audio sample; computer-executable instructions for generating, using the processor, an audio stimulus using the at least one calculated acoustic parameter; computer-executable instructions for presenting, using a hearing device, the audio stimulus to a user; computer-executable instructions for receiving a response to the audio stimulus from the user, wherein the response is indicative of an optimal parameter for the hearing device for the user; and computer-executable instructions for adjusting, using the processor, the hearing device based on the parameter.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
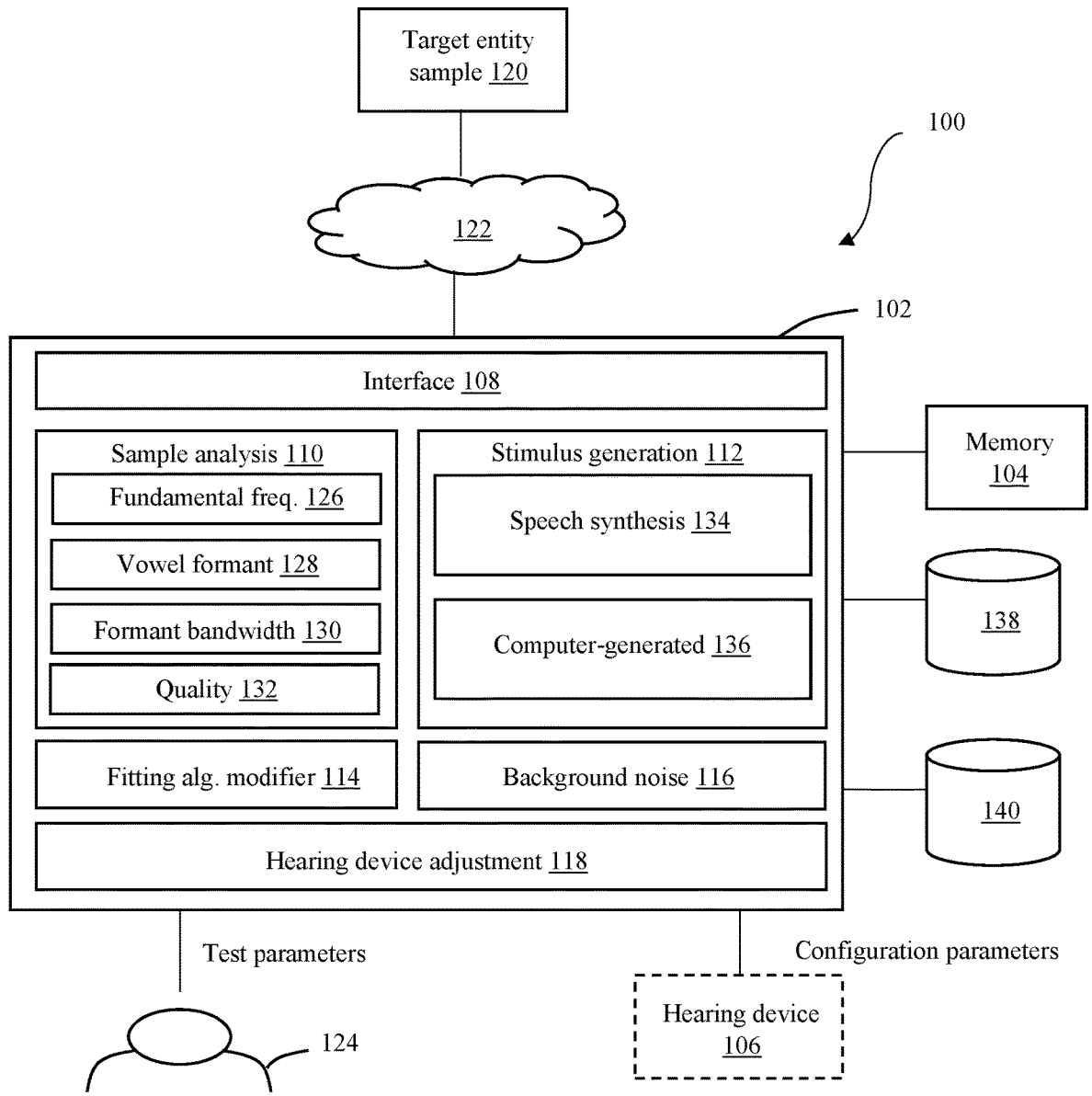
FIG. 1 illustrates a system for configuring a hearing device in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

As discussed above, users of hearing devices often have difficulty hearing or understanding (for simplicity, "hearing") certain people, even when wearing their hearing device. For example, a user may have difficulty hearing people such as their spouse, friends, co-workers, children, grandchildren, healthcare provider(s), or the like.

Similarly, users may have difficulty hearing others in certain environments. For example, ambient noise in environments such as on public transportation, on aircraft, in shopping centers, in restaurants, or in other places with background noise may make it difficult for a user to hear others, even when wearing their hearing device.

The embodiments described herein customize hearing device configuration tests to address the shortcomings of existing hearing devices and methods. The result is a customized hearing device that enables a user to better hear certain individuals, better hear in certain environments, or some combination of both.

FIG. 1 illustrates a system 100 for configuring a hearing device in accordance with one embodiment. The system 100 includes one or more processors 102 executing instructions stored on memory 104 to configure a hearing device 106. The processors 102 may be any hardware device capable of executing instructions stored on memory 104 to accomplish the objectives of the various embodiments described herein. The processors 102 may be implemented as software executing on a microprocessor, a field programmable gate array (FPGA), an application-specific integrated circuit (ASIC), or another similar device whether available now or invented hereafter.

In some embodiments, such as those relying on one or more ASICs, the functionality described as being provided in part via software may instead be configured into the design of the ASICs and, as such, the associated software may be omitted. The processors 102 may be configured as part of any sort of user device executed by a hearing device technician or other type of administrator in configuring the hearing device 106.

The memory 104 may be L1, L2, L3 cache, or RAM memory configurations. The memory 104 may include non-volatile memory such as flash memory, EPROM, EEPROM, ROM, and PROM, or volatile memory such as static or dynamic RAM, as discussed above. The exact type of memory 104 may of course vary as long as instructions for configuring a hearing device can be executed by the processor 102 to accomplish the objectives of various embodiments described herein.

The processors 102 may execute instructions stored on memory 104 to provide various modules to accomplish the objectives of the embodiments described herein. For example, the processor 102 may execute or otherwise include an interface 108, a sample analysis module 110, a stimulus generation module 112, a fitting algorithm modifier 114, a background noise generator 116, and a hearing device adjustment module 118.

In the context of the present application, the term "user" may refer to a person that wears a hearing device or is desirous of wearing a hearing device. More specifically, "user" may refer to a person that wants to customize a hearing device so that they are better able to hear a specific individual or in a specific environment.

In operation, one or more target entity samples 120 are received at the interface 108 over one or more networks 122. In the context of the present application, "target entity" may refer to an individual the user 124 has difficulty hearing. In this case, the target entity sample 120 may include one or more recordings of the individual speaking.

The term "target entity" may instead refer to a specific environment in which the user 124 has difficulty hearing. In this case, the target entity sample 120 may include an audio recording of sound in the environment. In some embodiments, the target entity may refer to a specific speaker in a specific environment or with certain background noise.

The network(s) 122 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 122 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The user 124 of the hearing device 106 to be fitted may provide the target entity sample 120 to the system 100 for use in configuring the hearing device 106. If the target entity is a person, the user 124 may submit an audio file of the target entity speaking during a casual conversation, speaking a predetermined series of sounds, or some combination thereof. The target entity sample 120 may be in any suitable audio format whether available now or invented hereafter.

The sample analysis module 110 may execute one or more procedures to determine acoustic parameters of the sample 120. The sample analysis module 110 may execute one or more sub-modules including, but not limited to, a fundamental frequency module 126, a vowel formant module 128, a formant bandwidth module 130, a quality module 132, or some combination thereof.

The fundamental frequency module 126 may analyze the target entity sample 120 to determine its pitch. For example, the fundamental frequency module 126 may extract data regarding the pitch of a speaker's voice.

The vowel formant module 128 may analyze the target entity sample 120 to determine vowel formant frequencies of the target entity. Formants are ranges of frequencies that are amplified by resonance of a speaker's voice.

Figure 2:
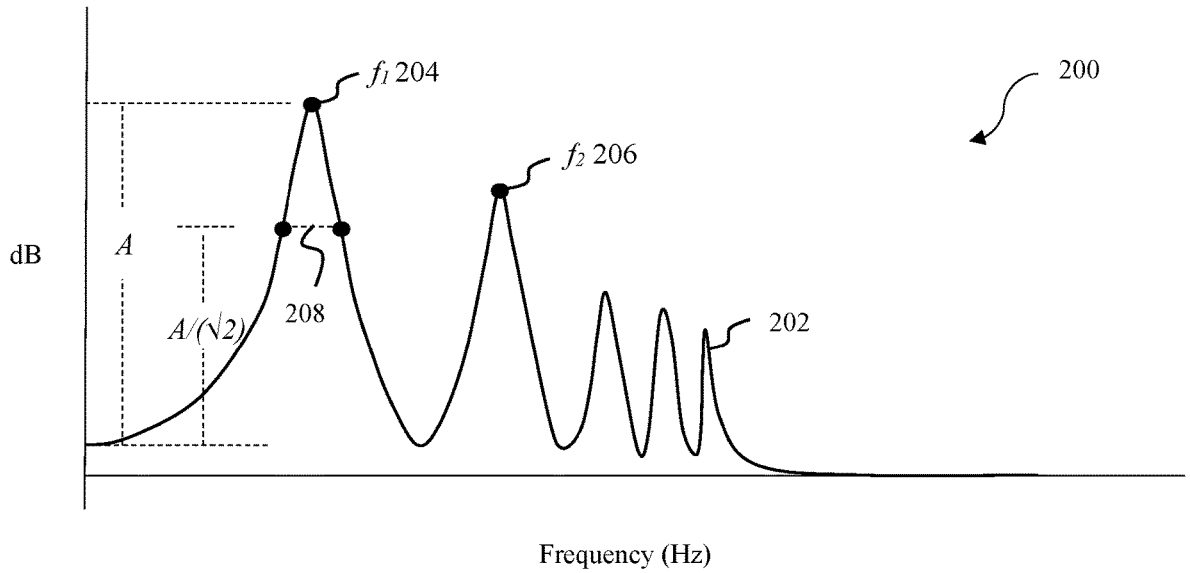
FIG. 2 illustrates an audio signal in accordance with one embodiment.

FIG. 2 illustrates a diagram 200 of an exemplary audio signal 202 (e.g., a portion of the target entity sample 120). The two left-most peaks of the signal 202 are formants, $f_1$ 204 and $f_2$ 206. As can be seen in diagram 200, formants $f_1$ 204 and $f_2$ 206 correspond to peaks that are ranges of amplified frequencies and are determined by a speaker's vocal tract.

Formants are defined by their frequency and width, and the lower two formants ($f_1$ 204 and $f_2$ 206) are associated with the production of vowels. Accordingly, the vowel formant module 128 may determine the vowel formant frequencies of the target entity. In this scenario, the target entity sample 120 may include one or more samples for which the target entity was instructed to pronounce various phonemes or phoneme combinations so that the vowel formant module 128 can extract the target entity's vowel formant frequency.

Vowels in the English language can easily be identified by the lower two formants. However, vowels in other languages may be more easily identified using a third formant. Additionally, a third formant may be considered in accordance with the fitting strategies described herein.

The formant bandwidth module 130 may analyze the target entity sample 120 to identify the target entity's formant bandwidth. As seen in FIG. 2, given a formant $f_1$ 204 with amplitude A, the formant bandwidth 208 refers to the difference in frequency between points on either side of the formant $f_1$ 204 peak that have an amplitude of $A/(\sqrt{2})$.

The quality module 132 may analyze the target entity sample 120 to extract acoustic parameters related to the target entity's voice quality. These parameters may include, but are not limited to, relative level of aspiration noise, spectral slope, or the like.

The parameters discussed above are merely exemplary, and the sample analysis module 110 may calculate other parameters in addition to or in lieu of those discussed above. The parameter(s) calculated by the sample analysis module 110 may vary and may depend on the target entity sample 120. For example, the sample analysis module 110 may calculate different parameters from a sample 120 if the target entity is an individual than if the target entity is an environment. Characteristics associated with an individual may include those mentioned above, such as pitch, formant frequencies, formant bandwidth, or the like. Characteristics associated an environment may include, but are not limited to, its overall intensity, spectral shape, temporal envelope, spectro-temporal changes, short- or long-term variability in intensity or spectral shape, or the like.

In some embodiments, the system 100 may analyze and alter the spectral slope or the ratio of energy above a certain frequency (e.g., above 1 kHz or 5 kHz). As another example, the system 100 may analyze and alter the relative power of the harmonic or periodic components and the aperiodic/noise components. The system 100 may also or alternatively analyze and alter the perturbation, short-term variability in the fundamental frequency, or intensity of the audio signal. The system 100 may also or alternatively analyze and alter the center frequency and bandwidth of one or more vowel formant frequencies. This change could be made at the vowel steady-state segment, at the consonant and vowel boundary, or both.

The sample analysis module 110 may communicate the calculated parameters to the stimulus generation module 112. The stimulus generation module 112 may consider output from any module 126-32, taken singularly or in combination with output from one or more of the other modules in generating stimuli.

The stimulus generation module 112 may leverage the parameters provided by the sample analysis module 110 to generate new stimuli (e.g., vowels, other phonemes, etc.) for speech-based fitting of the hearing device 106. The stimulus generation module 112 may generate the stimulus in a variety of ways. For example, the stimulus generation module 112 may execute or otherwise include a speech synthesis module 134, a computer-generated speech module 136, or both.

The speech synthesis module 134 may generate an artificial speech stimulus for use in performing hearing tests for fitting the hearing device 106. To generate the artificial speech stimulus, the speech synthesis module 130 may rely on recorded speech portions stored in one or more recorded speech databases 138.

Figure 3:
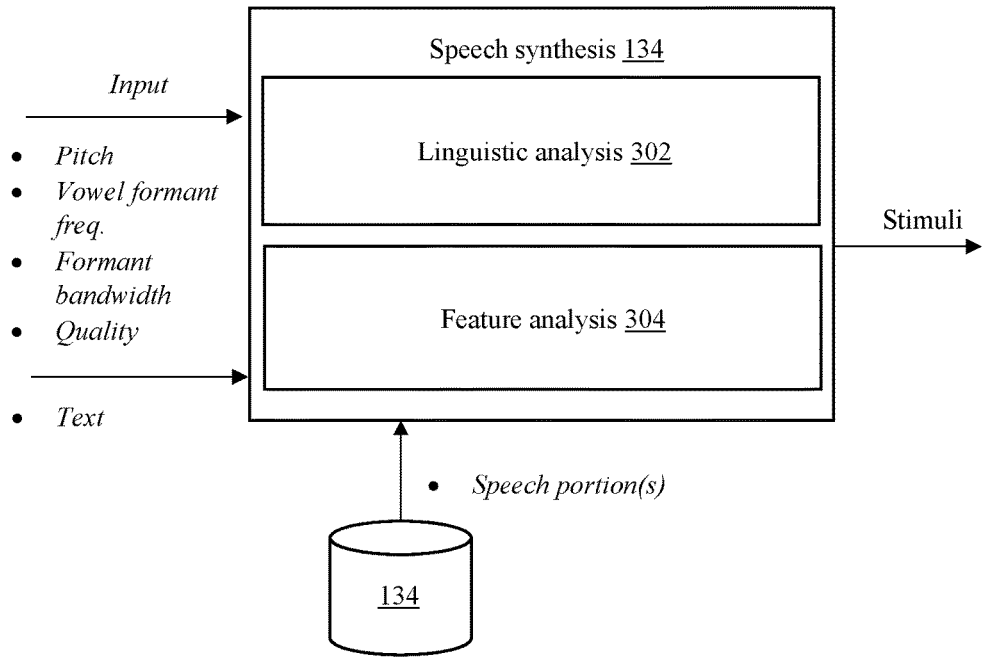
FIG. 3 illustrates the speech synthesis module of FIG. 1 in accordance with one embodiment.

FIG. 3 illustrates the speech synthesis module 130 of FIG. 1 in accordance with one embodiment. The speech synthesis module 130 may include or otherwise execute a linguistic analysis module 302 and a feature analysis module 304.

The speech synthesis module 130 may receive as input text, such as from a hearing device technician through a user device executing a user interface (not shown). The received input may also or instead include one or more parameters from the sample analysis module 110 discussed above.

The speech synthesis module 130 may also be in operable communication with one or more speech databases 138 to receive speech portions for generating stimuli. These speech portions may include recorded words, phrases, or more perceptually distinct units of sound such as phonemes, diphones, graphemes, or triphones.

The linguistic analysis module 302 may perform any tokenization on received text or other type of input to transform the input into word equivalents. The linguistic analysis module 302 may then convert any transformed word equivalents into sound signals.

The features analysis module 304 may extract relevant data from the parameters(s) received from the sample analysis module 110. The feature analysis module 304 may also perform any processing steps such as calculating averages, standard deviations, or otherwise convert the received parameters into any appropriate feature(s) to generate a stimulus or stimuli (for simplicity, "stimuli"). The output of the speech synthesis module 130 is therefore a stimulus or stimuli that retains parameters of the target entity while maintaining acoustic characteristics required for a speech-based fitting approach.

Referring back to FIG. 1, the computer-generated speech module 136 may generate a stimulus or stimuli by executing one or more formant speech synthesizers. The one or more speech synthesizers may produce a diverse set of sounds by varying a signal's pitch and volume.

In some embodiments, the processor 102 may need to modify the executed procedures or the generated stimuli to more closely match the target entity sample 120. For example, if the target entity is a young child, he or she may speak with higher frequencies than those typically seen with adults. Accordingly, the fitting algorithm modifier 114 may need to modify filter bandwidths, the filter-center frequency representing the hearing device gain curves, or the like. In these instances, custom fitting of the hearing device may require manipulation of the stimuli to achieve one or more optimal hearing device parameters. The hearing device adjustment module 118 may then send configuration parameters to the hearing device 106.

In some embodiments, a set of custom speech-stimuli may be developed a priori and the hearing device configuration procedure(s) may involve selecting a match to the target entity's voice. In these embodiments, the system 100 may include a voice database 140 storing recordings of a large number of speakers producing sounds appropriate for speech-based, hearing device fitting.

There may be a variety of techniques used to populate the voice database 140. One technique is to record a large number of speakers producing the speech sounds necessary for speech-based fitting of hearing devices. These sounds may include, but are not limited to, vowels, syllables, phonemes, words, phrases, or the like.

Another technique is to use computer-generated speech to create a wide range of "speakers" producing speech sounds necessary for speech-based fitting of hearing devices. These sounds may include, but are not limited to, vowels, syllables, phonemes words, phrases, or the like.

The disclosed embodiments may also implement a hybrid approach to populate the voice database 140. In this hybrid approach, one or more speakers are recorded producing the speech sounds necessary for speech-based fitting of hearing devices as discussed above. Then, the embodiments may use speech analyses and synthesis techniques to modify a recording to achieve an even greater range or variety of speakers.

Accordingly, the embodiments herein may generate stimuli in a plurality of different ways. For example, the embodiments herein may use an existing library of speech to find the closest match to a target entity speaker. As another example, embodiments herein may use the target entity speaker's voice but apply some modifications using a re-synthesis approach. This will entail analyzing the voice sample to determine constituent elements, modifying the elements, and then re-synthesizing the voice with those modifications. As yet another example, the embodiments herein may use a parametric approach (i.e., create a voice entirely by providing specific parameters).

Regardless of the techniques used, the voice database 140 may encompass a diverse range of speakers to sufficiently match many different types of speakers. That is, the voice database 140 ideally stores recordings representing people of different ages, genders, vocal tract size (e.g., short or tall speakers), voice quality, accents, or the like.

In these match-based embodiments, the sample analysis module 110 analyzes the target entity sample 120 to determine its key parameters (e.g., fundamental frequency, vowel formant frequency, formant bandwidth, measures related to the target entity's voice quality, etc.). These determined parameters or sample characteristics may then be compared with samples stored in the voice database 140. The stimulus generation module 112 may find a closest match between the target entity sample 120 and a record in the voice database 140.

For example, the stimulus generation module 112 or other suitable component of the system 100 (whether shown or not shown in FIG. 1), may select a stored sample that has the vowel formants closest to the vowel formants of the target entity sample 120. Accordingly, the selected sample from the voice database 140 will be similar to the target entity samples 120. However, the selected sample will also maintain the acoustic characteristics that are used with speech-based fitting approaches.

As with the embodiments discussed above, the fitting algorithm modifier 114 may need to adjust one or more fitting algorithms to accommodate changes in speech stimuli when attempting to generate a match between the sample 120 and a record in the voice database 140. The fitting algorithm modifier 114 may therefore adjust certain characteristics such as the filter bandwidth of the target entity sample 120.

The systems described herein may also customize a hearing device so that a user 124 can better hear others in specific acoustic environments. As discussed above, a user 124 may have difficulty in hearing people (or a specific person) in environments such as on public transportation, aircraft, shopping centers, restaurants, or any other sort of environment in which noise makes it difficult for a user to hear others.

To enable a user 124 to better hear in these types of environments, the system 100 may first receive a target entity sample 120 of the acoustic environment in which a user has difficulty hearing. For example, a user 124 may record a sample of the acoustic environment using a mobile phone or another device capable of making an audio recording.

The target entity sample 120 may be used in conjunction with speech stimuli used for the speech-based fitting of hearing devices. These speech-based fitting approaches typically use some background noise during testing. To customize the fitting for the specific acoustic environment, this standard noise used typically used with these stimuli may be replaced with the background noise of the target entity sample 120.

The stimulus generation module 112 may manipulate the noise level to maintain a fixed signal-to-noise ratio for each test stimulus. Alternatively, the noise level can be customized to ensure that speech recognition or discrimination performance is maintained at a specific accuracy for a given user 124.

In another embodiment, the sample analysis module 110 may analyze the sample 120 of the acoustic environment to determine key parameters thereof. For example, and without limitation, the sample analysis module 110 may determine parameters such as the sample's spectral shape, temporal envelope, spectro-temporal changes, or the like.

The background noise generator 116 may generate a new background noise based on these parameters. Specifically, the background noise generator may generate background noise that mimics key spectral temporal, spectro-temporal, or other parameters of the background noise typically used in hearing device fitting processes.

The processor 102 may then present one or more test parameters in the form of stimuli to the user 124. The user 124 may provide and the processor 102 may receive one or responses from the user 124, wherein the response(s) indicate if and how the user 124 perceives the stimuli. The response(s) may be indicative of one or more optimal hearing device configuration parameters for the user 124. Accordingly, the hearing device adjustment module 118 may configure the hearing device 106 based on one or more optimal configuration parameters.

Figure 4:
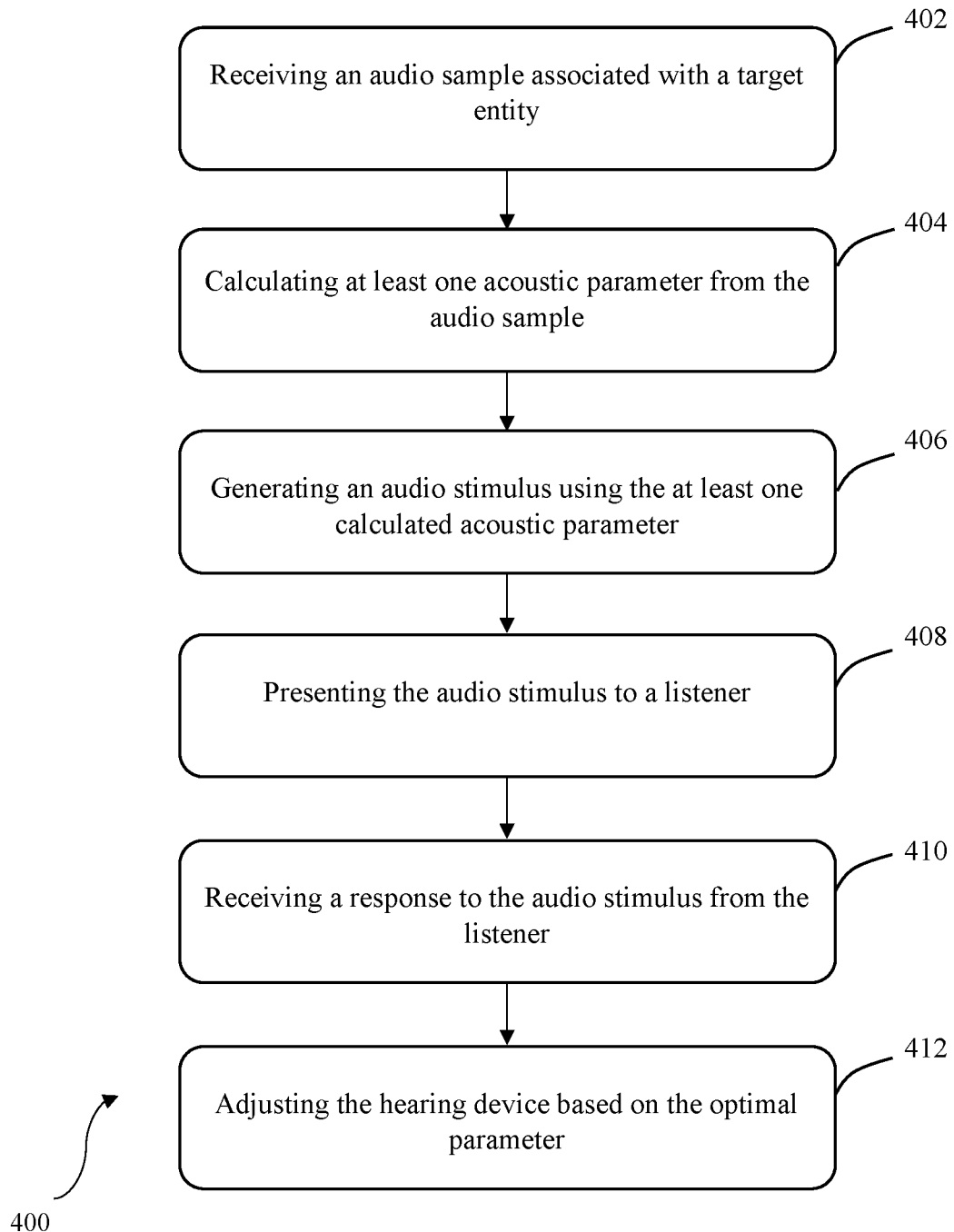
FIG. 4 depicts a flowchart of a method for configuring a hearing device in accordance with one embodiment.

FIG. 4 depicts a flowchart of a method 400 for configuring a hearing device in accordance with one embodiment. The system 100 of FIG. 1 or select components thereof may perform the steps of method 400.

Step 402 involves receiving, using an interface, an audio sample associated with a target entity. The target entity may refer to an individual that a user has difficulty hearing, particularly when wearing a hearing device. For example, the target entity may include a user's spouse, child, grandchild, friend, coworker, or the like. The user or some other personnel may record a sample of the target entity speaking and provide it to the interface. The sample may be or otherwise include an audio recording of the target entity saying predetermined phrases, words, vowels, phonemes, etc.

In other embodiments, the target entity may refer to a location or otherwise an environment in which the user has difficulty hearing others. As discussed previously, this may be any type of environment such as shopping centers, restaurants, bars, cafes, medical institutions, public transportation vehicles, fitness centers, airplanes, helicopters, boats, educational institutions, stadiums, arenas, or the like. This list is merely exemplary, and the embodiments herein may configure a hearing device based on any sort of environment in which a user has difficulty hearing. In these embodiments, the user may submit a recording of the environment such as one recorded on their mobile device.

In some embodiments, the audio sample may be generated based on a comparison of a target entity sample with records in one or more databases. For example, if the target entity is a person, method 400 may first determine a characteristic of the voice sample such as the fundamental frequency of the voice sample, a vowel formant frequency of the voice sample, or a formant bandwidth of the voice sample. A processor such as the processor 102 may then compare the characteristic of the voice sample to a library of existing voice samples, match the voice sample to an existing voice sample of the library based on the comparison, and select the matched existing voice sample as the audio sample.

Step 404 involves calculating, using a processor executing instructions stored on memory, at least one acoustic parameter from the audio sample. A sample analysis module such as the sample analysis module of FIG. 1 may analyze the target entity sample to calculate one or more acoustic parameters. The acoustic parameters may include, but are no limited to, characteristics such as the target entity's pitch or fundamental frequency, vowel formants, formant bandwidth, and other parameters related to the target entity's speech quality.

The calculated acoustic parameters may be different depending on whether the target entity is an environment or a person. For example, if the target entity is an environment, the sample analysis module may calculate parameters such as, but not limited to, the environment's spectral shape, temporal envelope, spectro-temporal changes, or the like.

Step 406 involves generating, using the processor, an audio stimulus using the at least one calculated acoustic parameter. A stimulus generation module such as the stimulus generation module 112 of FIG. 1 may perform this step. As discussed above, the stimulus generation module 112 may execute a speech synthesis module such as the speech synthesis module 130 produce the stimulus for presentation to a user such as a hearing device user. The stimulus may be presented to the user such that the user can provide feedback that is subsequently used to configure the hearing device.

The stimulus generation module may instead execute a computer-generated module 132 to produce a computer-generated stimulus for presentation to the user. The stimulus may be presented to the user such that the user can provide feedback that is subsequently used to configure the hearing device.

Step 408 involves presenting, using a hearing device, the audio stimulus to a user. In operation, a user may be wearing the hearing device or some other apparatus through which they can hear audio stimuli. There may be a series of different stimuli presented to the user.

Step 410 involves receiving at the interface a response to the audio stimulus from the user, wherein the response is indicative of an optimal parameter for the hearing device for the user. For example, the user may indicate if or when they hear a presented stimulus. The user's responses or lack of responses may indicate one or more optimal parameters for the hearing device. The user may provide their response to the stimulus by, for example and without limitation, raising one of their hands to indicate in which ear they hear a stimulus, providing a verbal cue to an administrator, or providing some input to a user device executing a user interface.

Step 412 involves adjusting, using the processor, the hearing device based on the optimal parameter. A hearing device adjustment module such as the hearing device adjustment module 118 of FIG. 1 may adjust one or more settings of a hearing device such as volume control, microphone settings, or the like.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method of configuring a hearing device, the method comprising:
   receiving, using an interface, an audio sample associated with a target entity;
   calculating, using a processor executing instructions stored on memory, at least one acoustic parameter from the audio sample;
   generating, using the processor, an audio stimulus using the at least one calculated acoustic parameter;
   presenting, using a hearing device, the audio stimulus to a user;
   receiving at the interface a response to the audio stimulus from the user, wherein the response is indicative of an optimal parameter for the hearing device for the user; and
   adjusting, using the processor, the hearing device based on the optimal parameter.

2. The method of claim 1 wherein the target entity is a person or an environment.

3. The method of claim 1 wherein the audio stimulus further includes a plurality of acoustic characteristics for tuning the hearing device.

4. The method of claim 1 wherein calculating the at least one acoustic parameter includes:
   analyzing the audio sample associated with the target entity, and
   determining, based on the analysis of the audio sample, a fundamental frequency of the audio sample, vowel formant frequencies of the audio sample, or formant frequencies of the audio sample.

5. The method of claim 1 wherein receiving the audio sample includes:
   receiving a voice sample of a person,
   determining a characteristic of the voice sample, wherein the characteristic of the voice sample is a fundamental frequency of the voice sample, a vowel formant frequency of the voice sample, or a formant bandwidth of the voice sample,
   comparing the characteristic of the voice sample to a library of existing voice samples,
   matching the voice sample to an existing voice sample of the library based on the comparison, and
   selecting the matched existing voice sample as the audio sample.

6. The method of claim 1 further comprising manipulating the audio stimulus prior to presenting the audio stimulus to the user.

7. The method of claim 1 wherein generating the audio stimulus includes generating the audio stimulus based on the audio sample using speech synthesis or computer-generated speech.

8. The method of claim 1 wherein the audio sample includes ambient noise in an environment, and the generated audio stimulus is based on the ambient noise and speech stimulus.

9. The method of claim 8, wherein the calculated acoustic parameter of the ambient noise includes spectral shape of the ambient noise, temporal overlap of the ambient noise, or spectro-temporal changes of the ambient noise.

10. A system for configuring a hearing device, the system comprising:
    an interface for receiving an audio sample associated with a target entity;
    a memory; and
    a processor executing instructions stored on the memory to:
       calculate at least one acoustic parameter from the audio sample,
       generate an audio stimulus using the at least one calculated acoustic parameter, wherein the interface is further configured to present the audio stimulus to a user,
       receive a response to the audio stimulus from the user, wherein the response is indicative of an optimal parameter for the hearing device for the user, and
       adjust the hearing device based on the optimal parameter.

11. The system of claim 10 wherein the target entity is a person or an environment.

12. The system of claim 10 wherein the audio stimulus further includes a plurality of acoustic characteristics for tuning the hearing device.

13. The system of claim 10 wherein the processor calculates the at least one acoustic parameter by:
    analyzing the audio sample associated with the target entity, and
    determining, based on the analysis of the audio sample, a fundamental frequency of the audio sample, vowel formant frequencies of the audio sample, or formant frequencies of the audio sample.

14. The system of claim 10 wherein the audio sample is a voice sample of a person, and the processor is further configured to:
    determine a characteristic of the voice sample, wherein the characteristic of the voice sample is a fundamental frequency of the voice sample, a vowel formant frequency of the voice sample, or a formant bandwidth of the voice sample,
    compare the characteristic of the voice sample to a library of existing voice samples,
    match the voice sample to an existing voice sample of the library based on the comparison, and
    select the matched existing voice sample as the audio sample.

15. The system of claim 10 wherein the processor is further configured to manipulate the audio stimulus prior to presenting the audio stimulus to the user.

16. The system of claim 10 wherein the processor generates the audio stimulus using speech synthesis or computer-generated speech.

17. The system of claim 10 wherein the audio sample includes ambient noise in an environment, and the generated audio stimulus is based on the ambient noise and speech stimulus.

18. The system of claim 17 wherein the calculated acoustic parameter of the ambient noise includes spectral shape of the ambient noise, temporal overlap of the ambient noise, or spectro-temporal changes of the ambient noise.

19. A non-transitory computer readable medium containing computer-executable instructions for performing a method of configuring a hearing device, the non-transitory computer readable medium comprising:
- computer-executable instructions for receiving, using an interface, an audio sample associated with a target entity;
- computer-executable instructions for calculating, using a processor executing instructions stored on memory, at least one acoustic parameter from the audio sample;
- computer-executable instructions for generating, using the processor, an audio stimulus using the at least one calculated acoustic parameter;
- computer-executable instructions for presenting, using a hearing device, the audio stimulus to a user;
- computer-executable instructions for receiving a response to the audio stimulus from the user, wherein the response is indicative of an optimal parameter for the hearing device for the user; and
- computer-executable instructions for adjusting, using the processor, the hearing device based on the parameter.

\* \* \* \* \*